US009526995B2

United States Patent
Brunstetter et al.

(10) Patent No.: US 9,526,995 B2
(45) Date of Patent: Dec. 27, 2016

(54) VIDEO GAME RECORDING AND PLAYBACK WITH VISUAL DISPLAY OF GAME CONTROLLER MANIPULATION

(75) Inventors: Aaron Brunstetter, Oceanside, CA (US); Gary M. Zalewski, Oakland, CA (US)

(73) Assignee: SONY INTERACTIVE ENTERTAINMENT AMERICA LLC, San Mateo, CA (US)

( * ) Notice: Subject to any disclaimer, the term of this patent is extended or adjusted under 35 U.S.C. 154(b) by 1826 days.

(21) Appl. No.: 11/848,451

(22) Filed: Aug. 31, 2007

(65) Prior Publication Data
US 2008/0119286 A1 May 22, 2008

Related U.S. Application Data

(60) Provisional application No. 60/860,937, filed on Nov. 22, 2006.

(51) Int. Cl.
*A63F 13/497* (2014.01)
*A63F 13/95* (2014.01)
(Continued)

(52) U.S. Cl.
CPC ............... *A63F 13/95* (2014.09); *A63F 13/00* (2013.01); *A63F 13/31* (2014.09); *A63F 13/497* (2014.09);
(Continued)

(58) Field of Classification Search
CPC .. A63F 13/86; A63F 13/497; A63F 2300/577; A63F 2300/634; A63F 2011/0097
(Continued)

(56) References Cited

U.S. PATENT DOCUMENTS 4,787,051 A 11/1988 Olson
4,843,568 A 6/1989 Krueger
(Continued)

FOREIGN PATENT DOCUMENTS

GB 2388418 A 12/2003
WO WO 98/46029 10/1998
(Continued)

OTHER PUBLICATIONS

Martin Otten, "Broadcasting Virtual Games in the Internet," Jun. 2001.
(Continued)

*Primary Examiner* — Damon Pierce
(74) *Attorney, Agent, or Firm* — Polsinelli LLP

(57) ABSTRACT

A system and method for recording and playback of game data is provided. A recording engine may be configured to record and playback game data, including broadcast data received over a network. The recording engine may be included in a game console or at other network-enabled devices, such as a desktop computer. The recording engine may be configured to record the game data in a buffer memory, an archival memory, and to assist in the display of the game (e.g., interacting with a graphics processing unit). Game data stored in the buffer memory may later be transferred to the archival memory. Playback commands may be operable when a portion of the game broadcast has been recorded. When a playback command is received, the game recording engine may access a portion of the game data from buffer or archival memory and displays a selected portion and may be subject to certain seek functions (e.g., fast forward and rewind). Spectators may be able to independently archive and playback game data using local memory.

35 Claims, 7 Drawing Sheets

(51) Int. Cl.
*A63F 13/31* (2014.01)
*A63F 13/00* (2014.01)
*A63F 13/86* (2014.01)

(52) U.S. Cl.
CPC .......... *A63F 13/86* (2014.09); *A63F 2300/305* (2013.01); *A63F 2300/50* (2013.01); *A63F 2300/577* (2013.01); *A63F 2300/634* (2013.01)

(58) Field of Classification Search
USPC .................................................... 463/36–39
See application file for complete search history.

(56) References Cited

U.S. PATENT DOCUMENTS

| | | | |
|---|---|---|---|
| 5,128,671 | A | 7/1992 | Thomas, Jr. |
| 5,371,551 | A | 12/1994 | Logan et al. |
| 5,440,326 | A | 8/1995 | Quinn |
| 5,528,265 | A | 6/1996 | Harrison |
| 5,745,126 | A * | 4/1998 | Jain et al. .................... 382/154 |
| 5,774,668 | A | 6/1998 | Choquier et al. |
| 5,850,352 | A | 12/1998 | Moezzi et al. |
| 5,926,179 | A | 7/1999 | Matsuda et al. |
| 6,001,017 | A * | 12/1999 | Okano et al. ................... 463/43 |
| 6,040,841 | A | 3/2000 | Cohen et al. |
| 6,157,368 | A | 12/2000 | Faeger |
| 6,233,389 | B1 | 5/2001 | Barton et al. |
| 6,325,717 | B1 | 12/2001 | Kawagoe et al. |
| 6,352,479 | B1 | 3/2002 | Sparks, II |
| 6,375,572 | B1 | 4/2002 | Masuyama |
| 6,571,193 | B1 | 5/2003 | Unuma et al. |
| 6,842,877 | B2 | 1/2005 | Robarts et al. |
| 6,999,083 | B2 | 2/2006 | Wong et al. |
| 7,000,180 | B2 | 2/2006 | Balthaser |
| 7,158,118 | B2 | 1/2007 | Liberty |
| 7,173,604 | B2 | 2/2007 | Marvit et al. |
| 7,176,887 | B2 | 2/2007 | Marvit et al. |
| 7,180,501 | B2 | 2/2007 | Marvit et al. |
| 7,192,351 | B2 | 3/2007 | Rozkin et al. |
| 7,225,414 | B1 | 5/2007 | Sharma et al. |
| 7,239,301 | B2 | 7/2007 | Liberty et al. |
| 7,262,760 | B2 | 8/2007 | Liberty |
| 7,272,298 | B1 | 9/2007 | Lang et al. |
| 7,280,096 | B2 | 10/2007 | Marvit et al. |
| 7,301,526 | B2 | 11/2007 | Marvit et al. |
| 7,301,527 | B2 | 11/2007 | Marvit |
| 7,301,528 | B2 | 11/2007 | Marvit et al. |
| 7,301,529 | B2 | 11/2007 | Marvit et al. |
| 7,414,611 | B2 | 8/2008 | Liberty |
| 7,489,298 | B2 | 2/2009 | Liberty et al. |
| 7,489,299 | B2 | 2/2009 | Liberty et al. |
| 2002/0085097 | A1 | 7/2002 | Comenarez |
| 2003/0038805 | A1 * | 2/2003 | Wong et al. ................... 345/473 |
| 2004/0111755 | A1 * | 6/2004 | Perlman ........................ 725/133 |
| 2004/0192440 | A1 * | 9/2004 | Evans et al. .................... 463/30 |
| 2004/0212589 | A1 | 10/2004 | Hall |
| 2007/0117617 | A1 * | 5/2007 | Spanton et al. ................ 463/29 |

FOREIGN PATENT DOCUMENTS

| | | |
|---|---|---|
| WO | WO 01/75545 | 10/2001 |
| WO | WO2008056180 A2 | 5/2008 |

OTHER PUBLICATIONS

"The Multicast Spectator Mode," Dec. 6, 2001, www.half-life.dk.
Tom Ham, "Multicast Spectator Tech for Half-Life," Game Spy Articles, last accessed Dec. 14, 2007, http://archive.gamespy.com/articles/june01,hlmod3b/.
Tom Ham, "Multicast Spectator Tech for Half-Life," Game Spy Articles, lasst accessed Dec. 14, 2007, http://archive.gamespy.com/articles/june01/hlmod3b/index2.shtm.
"RTIME Announces First 100-Person Twitch Game for Internet; "RTIME Rocks!" Demonstrates the Power of the RTIME Interactive Networking Engine to Support Large Scale, High Performance, Internet Game Play," Business Wire, Apr. 14, 2007.
DeWitt, Thomas and Edelstein, Phil, "Pantomation: A System for Position Tracking," Proceedings of the 2nd Symposium on Small Computers in the Arts, Oct. 1982, pp. 61-69.

* cited by examiner

VIDEO GAME RECORDING AND PLAYBACK WITH VISUAL DISPLAY OF GAME CONTROLLER MANIPULATION

CROSS-REFERENCE TO RELATED APPLICATIONS

This application claims the priority benefit of U.S. patent application No. 60/860,937 filed Nov. 22, 2006 and entitled "System and Method of Providing Assistance Over a Network," the disclosure of which is incorporated herein by reference.

BACKGROUND OF THE INVENTION

Field of the Invention

The present invention relates, generally, to network gaming and more particularly to a system and method for the recording and playback of game data generated in a network community comprising participants and spectators, wherein the recording and playback of game data may include a visual display of game controller manipulation.

Description of Related Art

Conventionally, users of electronic games compete with one another by selecting a two-player option associated with a particular electronic game via a single home gaming console. Accordingly, two players can play at the same time or one-at-a-time in order to compete for points or other awards associated with the particular electronic game.

As electronic game consoles have become more popular and network technologies have become more pervasive, more options for head-to-head competition have entered the marketplace. Some electronic game consoles are equipped with modems or other network connectors allowing users to communicate over a network through the exchange of data related to the game. By communicating over a network, users (e.g., participants) can connect to various other users' gaming consoles either directly or via intermediate computing nodes (e.g., a central server or other game consoles in a network) and compete against those various other users while playing a network game.

Users who compete over a network are unable to record their game play for later review. For example, a user may wish to review a section of their completed game to find a way around obstacles or to learn a competitor's strategy. Additionally, a user may want to record and display a section of the game to various other participants or spectators where the user performed particularly well.

Offering recording and playback functionality may be particularly relevant with respect to the increased complexity of some video games. As game characters and other player controller objects have become capable of executing more maneuvers, game controllers have incorporated more control options (e.g., multiple joysticks, Z-triggers, shoulder-triggers, motion tracking along X-, Y-, and Z-axes, and the like). The use of the various control options—alone, in combination, and sometimes in particular sequences—has increased the complexity of executing certain tasks in particular games or in particular environments within a game. Correspondingly, it may be helpful for some users to have increased knowledge of how a particular task or maneuver was executed with respect to the various control options on a game controller.

Additionally, users who are not playing a particular game may desire to watch a game being played by other players as a spectator. For example, players who belong to a game clan may want to watch fellow members of their clan play against other game clans. Alternatively, users who are unfamiliar with video games or with a particular video game may watch a game without participating before purchasing a game console or the particular game, or entering the game environment. For example, parents may watch a game as spectators to determine whether the game is appropriate for their children prior to purchasing the game.

Furthermore, a user is not presently able to control playback of a game. For example, a spectator may miss a portion of a game if he needs to leave the display for a short period of time. Additionally, the user cannot rewind or fast forward through portions of the game. Spectators may, therefore, lose interest in watching the game and may decide not to purchase the game or otherwise become involved in the game community. As such, there is a need for game developers and network service providers to provide users the ability to record game data for later viewing and to provide playback controls for the same.

SUMMARY OF THE INVENTION

An exemplary embodiment of the present invention provides a system and method for recording and playing back a network game by a participant or a spectator. Embodiments of the present invention may provide for a graphic display of a game controller whereby a user may view game playback while simultaneously viewing a graphic representation of how and when a game controller must be manipulated to execute a particular maneuver viewed during game playback.

According to one exemplary embodiment of the present invention, a command to record at least a portion of game data may be sent to a recording engine at a participant client or a spectator client. The game data may be stored in a memory at the participant client or the spectator client's electronic entertainment system. After at least a portion of the data has been recorded, one or more playback controls indicating a selected portion of the game data may be received from the user. The game data may then be retrieved and displayed in response to the playback controls.

The game data may be generated by a local electronic entertainment system. In such an embodiment, the user may often be a participant in a video game that generates the game data. Alternatively, the game data may be received from another electronic entertainment system via a network. In such an embodiment, the user receiving the game data may be a spectator or a player of the video game over the network.

Further embodiments may include storing game data in a buffer memory that may operate in a first-in, first-out (FIFO) mode. In such an operation, only the most recent data may be stored. The game data displayed to the user may be automatically stored, in the buffer memory to permit playback control of a real-time game.

Still further embodiments of the present invention may include storing the game data in an archival memory. The archival memory may be local relative to the recording engine. Such an embodiment may include compressing the game data prior to storing the game data in the archival memory.

Various playback controls may be operative while the game is played such that the recording engine continues to record the game data while an earlier portion of the game data is displayed to a user. Additionally, a user may record a second game taking place on the network while displaying a selected portion of a game that was recorded earlier. The user, therefore, may watch video games regardless of when the games are broadcast over a network.

DETAILED DESCRIPTION

Figure 1:
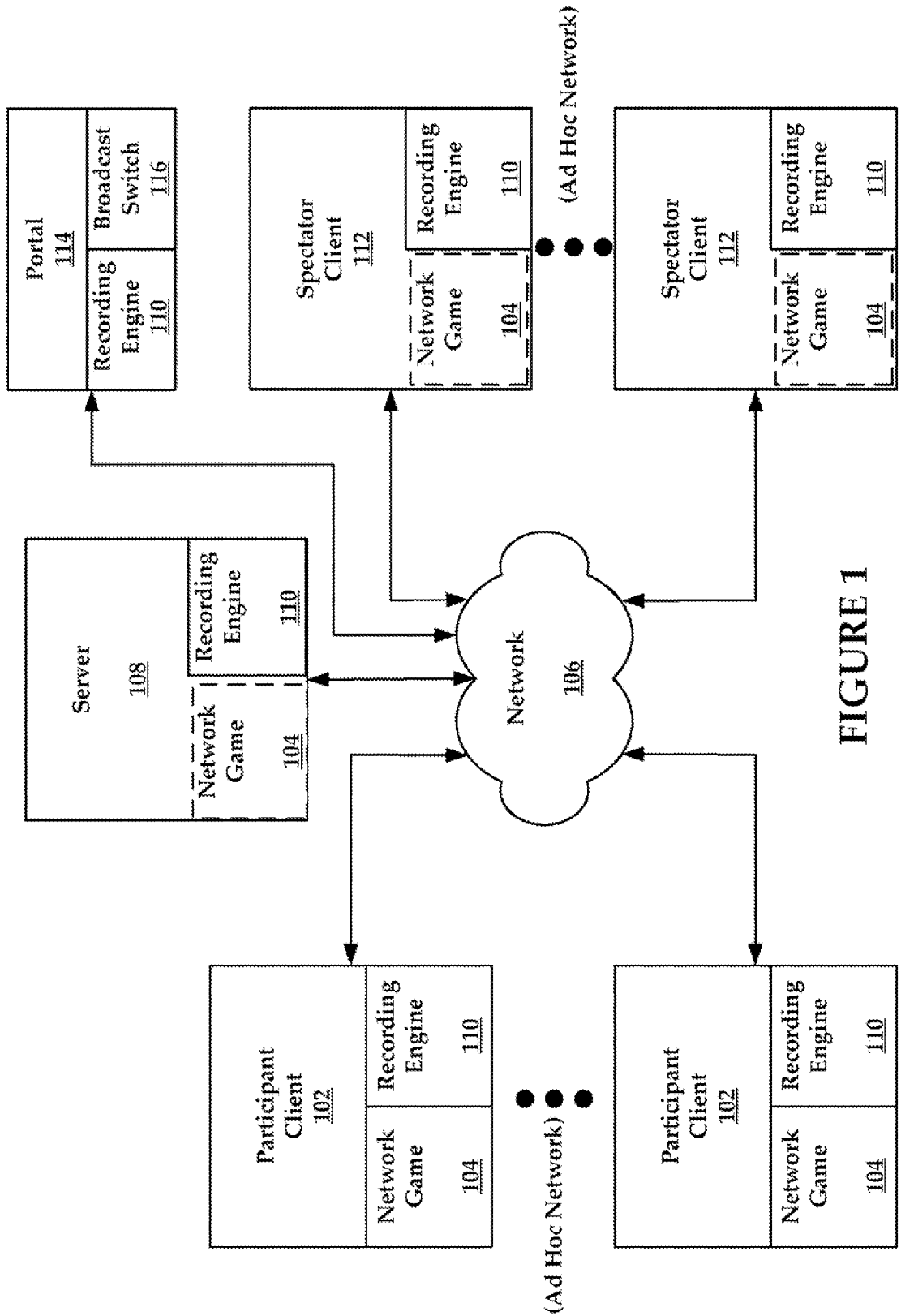
FIG. 1 illustrates a schematic diagram of an exemplary network gaming architecture for game recordation and playback according to an embodiment of the present invention.

FIG. 1 illustrates a schematic diagram of an exemplary network gaming architecture for game data recordation and playback according to an embodiment of the present invention. The elements identified in FIG. 1 are exemplary and may include various alternatives, equivalents, or derivations thereof.

One or more participant clients 102 may be communicatively coupled to a server 108 via a communications network 106. The participant clients 102 may include one or more video games 104 and a recording engine 110. Video game 104 may be built-in (e.g., pre-loaded into memory) to the participant client 102 or be introduced through a computer-readable medium such as an optical disk or memory card. Video game 104 may also be obtained over a network as further discussed herein. Video games 104 may be designed or otherwise capable of network game play. Recording engine 110 may be built-in to the participant client 102 or a separate device or part of a separate device coupled to the participant client 102 either locally or over the network 106 (e.g., at a game server 108 or a dedicated game recordation server (not shown)). One or more spectator clients 112 may be connected to the server 108 via communications network 106. The spectator clients 112 may include a recording engine 110 and one or more optional video games 104.

In some embodiments, components of the recording engine 110 (e.g., various software modules) may be provided as a part of a particular video game 104 (e.g., provided on the same machine-readable medium as the game). In a preferred embodiment, however, the recording engine 110 offers cross-platform and cross-title neutrality (i.e., the engine 110 is not dedicated to any particular piece of hardware or game title). A module (or application), as referenced in the present application, is to generally be understood as a collection of routines that perform various system-level functions and may be dynamically loaded and unloaded by hardware and device drivers as required. The modular software components described herein may also be incorporated as part of a larger software platform or integrated as part of an application specific component.

In some embodiments of the present invention, a user not actively playing a game may be a spectator. That is, the user may be watching others play the particular game. Alternatively, a spectator may become an active participant in a game depending on certain admission requirements of the particular game (e.g., 'room' for additional players, skill level requirements, identification requirements, membership in a particular 'clan,' hardware and/or network capability requirements, and so forth). In still further embodiments, an active participant may later become a spectator. For example, the user may be killed in the game environment, falls to achieve a particular objective, or 'taps out' whereby the particular user voluntarily leaves the environment and another user enters. In that regard, changing from participant to spectator status may be involuntary (in the case of, for example, death of a game character) or voluntary (as may the case with regard to 'tapping out').

The participant client 102 may comprise a game console such as a PlayStation® 3, a laptop computing device, a portable game device such as the PlayStation® Portable, a desktop computing device, a cellular telephone, or any other device capable of executing the video game 104 and connecting to the network 106. In some embodiments, the participant client 102 may be identified by an identification number such as a client ID or an address mechanism such as an IP address. In other embodiments, a user of the participant client 102 may 'sign on' to a network with a user name and/or password and may be temporarily associated with the participant client 102.

The spectator client 112 may similarly comprise a game console such as a PlayStation® 3, a laptop computing device, a portable game device such as the PlayStation® Portable, a desktop computing device, a cellular telephone, or any other device capable of rendering game data generated by the video game 104 and connecting to the network 106. The spectator client 112 may, in certain embodiments, not be enabled to act as a participant client 102 in video game 104. For example, the spectator client 112 may only have or have access to certain software related to the video game 104 that, while allowing for passive viewing, does not allow for interactive game play. In some embodiments, the spectator client 112 may be identified by an identification number such as a client ID or an address mechanism such as an IP address. In other embodiments, a user of the spectator client 112 may 'sign on' to a network with a user name and/or password and may be temporarily associated with the spectator client 112.

A spectator client 112 may further be configured with certain 'chat' functionality such that users may comment as to game occurrences as they observe the game being player (e.g., 'great move!' or 'did you see that!?!'). Such chat functionality may be introduced through a textual interface (e.g., an instant messenger application) or through voice interaction as may occur through VOIP and a headset/microphone. Chat functionality may be broadcast to all recipients of the game data or unicast or multicast between particular users having a private conversation.

It should be noted that in some embodiments of the present invention, a single game console device (e.g., a PlayStation® 3) may be capable of acting as both a participant client 102 and a spectator client 112. This dual functionality may depend on the presence of particular a video game 104 or version thereof (e.g., a fully operative version versus a passive viewing version). The particular functionality of a particular device at any given time may also be a result of certain admission requirements of the game 104 or the network 106 as may be governed by a central or master game server (e.g., server 108). Other rules governing user and device status as a spectator or a client are within the scope of the present invention. Other network connection methodologies and system architectures may be implemented, like those disclosed in commonly owned U.S. patent application Ser. No. 10/059,837 for a "System and Method for Distributing Data between a Telephone Network and an Entertainment Network," the disclosure of which is incorporated herein by reference.

In some embodiments of the present invention, the server 108 may include the video game 104 used in network game play and the participant clients 102 and the spectator clients 112 access the video game 104 on the server 108 via the network 106. The video game 104 on the server 108 may be the entire game, a portion of the game, data related to the game or simply a node allowing for the pass though, observation and/or collection of data related to the game as the game is played by users in the game community. The video game 104 may be similarly organized at various participant clients 102 (e.g., portions of the game or game data related to the game). Video game 104 may also be provided through, for example, a third-party content library server. In such an embodiment, the library server may or may not be a part of the playback architecture.

In some embodiments of the present invention, a portal 114 may also be offered. Portal 114 may comprise a recording engine 110 and a game broadcast switch 116. The portal 114 may receive portions of the game data from the participant clients 102 or from the server 108 as it communicates with participant clients 102. This game data may be unicast, multicast, or broadcast depending upon, for example, the particular transmission point of the game data (e.g., server 108 versus a participant client 102). The spectator clients 112 may also provide for the delivery of game data to the portal 114. For example, a spectator client 112 may receive game data being generated at participant client 102. The spectator client 112 may find that particular content particularly interesting and subsequently transmit that data to another spectator client 112 or to the portal 114.

It should be noted that each client (both spectator 112 and participant 102) may act as various nodes in a vast network of gaming devices with regard to passing along game data to other nodes in the network for actual use or subsequent transmission to yet another recipient. Similarly, certain game devices as may be used in an embodiment of the present invention may utilize mobile ad-hoc network technology (sometimes referred to as MANET). Ad-hoc network technology, generally, allows for a self-configuring network of mobile routers and hosts to be connected by wireless links that form an arbitrary topology. The routers may randomly organize themselves thus causing the network's wireless topology to change rapidly and, sometimes, unpredictably. Ad-hoc networks may allow for the creating of a network 'on the fly' (e.g., two users with portable gaming devices encountering one another), which may operate either in a standalone fashion (e.g., device to device) or may connect to a larger communications network such as the Internet.

The broadcast switch 116 may be configured to provide a series of commands from a user of the portal 114, which may include a video game 104, a portion of game data relating to network game 104, and an identifier indicating a participant client 102 or spectator client 112 (e.g., a source of the game data). The broadcast switch 116 may then provides for the receipt of the appropriate portion of the game data related to the appropriate game data as generated or passed along by the appropriate participant client 102 or spectator client 112. In this respect the broadcast switch 116 may offer functionality similar to that of changing a television station wherein the user of the portal 114 times into the appropriate channel, which in this case may be representative of a game and particular game data as may be generated by a particular user. In some embodiments, the game data identified by the broadcast switch 116 may actually refer to game data stored in archival memory, either at a client, device or, for example, a dedicated server or other network storage device.

The portal 114 may be accessed by users via an interface over the network 106. For example, the interface may comprise a website providing informational connectivity to the Internet or a secure location accessed via a private network. In some instances, the portal 114 may be a dedicated computing device (e.g., a kiosk in a computer store advertising a specific game) offering only portal functionality, that is, the user of the portal 114 may not be able to switch from client to spectator status and may also have limited control over certain game data versus a spectator who could subsequently enter the game environment.

The interface of portal 114 may indicate, for example, at least one network game 104, the number of participants participating in the network game 104, the number of spectators watching the network game 104, and portions of the game data of the network game 104 available for broadcast in addition to the locale of those game data portions. For example, a first 'live' portion of game data may be accessed from a participant actually playing the game. Another portion of game data (e.g., an archived portion) may be accessed from a spectator. Another archived portion may be accessed from yet another spectator. Still yet a third archived portion may be accessed from, for example, server 108 or some other central storage archive. Through the use of optional recording engine 110, the user of the portal 114 may also record (locally) a live game feed or record an archived game feed being displayed via, for example, another spectator (e.g., the user of the portal 114 may be making a local copy of a spectator copy of previous live game data).

Various users in the network (i.e., spectators and participants) may set security credentials as to the access of certain game data. For example, the credentials may identify who may access what portions of what game data and from where. As such, portal 114 may require certain user credentials (e.g., name and password) in order to gain access to certain game data.

The interface of portal 114 may further indicate a level in the network game 104, whether permission is required to be an active participant or a spectator relative this particular game or user, the skill level or game clan affiliation of the participants, and so forth. The interface of portal 114 may further include an option to download or upload a portion of game data to be accessed at a later time via other users of the portal 114.

It should be understood that the reference to a participant client 102, a spectator client 112, a portal 114, and a server 108 is merely for the convenience of understanding the present invention. Embodiments of the present invention may be implemented in the context of a peer-to-peer network, a client-server network, an ad hoc network, or within a peer-group (e.g., a specified group of peers). Therefore, in some instances, a client may junction as a server and vice versa depending on the timing and the nature of a data exchange. For example, various clients in a peer-to-peer or ad hoc network may each comprise a portion of a network game 104 or game data and may send and receive the same. As such, any reference to a client or a server is meant to be inclusive of operations performed by either of the entities unless specified otherwise by a particular limitation in the claims. In some instances, a device with participant/spectator/portal/server functionality may be referred to by the generic moniker, 'network node' or 'computing node.' In that regard, participant client 102, the spectator client 112, portal 114, and server 108 may ail be considered network or computing nodes.

The game 104 may comprise software instructions that may be processed on or by the participant client 102 or the spectator client 112 as well as by portal 114 and that may allow for communication and data exchanges with the other clients, the portal 114, or the server 108 via the network 106. The network 106 may include, for example, the internet. Other proprietary or closed networks may be used either exclusively or in conjunction with the Internet. Certain security protocols (e.g., SSL or VPN) or encryption methodologies may be used to ensure the security of data exchanges over network 106, especially if the network 106 is a publicly accessible network such as the Internet. The network 106 may include a dedicated game network. The game network may be further dedicated to one video game 104 or to members of a game lobby or a clan.

Users associated with each of the participant clients 102 may interact with other users (e.g. other participant clients 102) playing the video game 104. Accordingly, the users at each of the participant clients 102 may compete with one another despite not being physically present with one another or sharing a common gaming device or console.

Users associated with each of the spectator clients 112 may also act as participant clients 102, such that these users are able to join a game 104 as a participant. These users may be able to join the game 104 depending on factors such as the aforementioned references to skill level and clan, affiliation. These users may additionally be able to leave the network game 104 and return to spectator status. Alternatively, spectator clients 112 may have limited capabilities such that the users associated with them may not be able to participate in a game 104.

Figure 3:
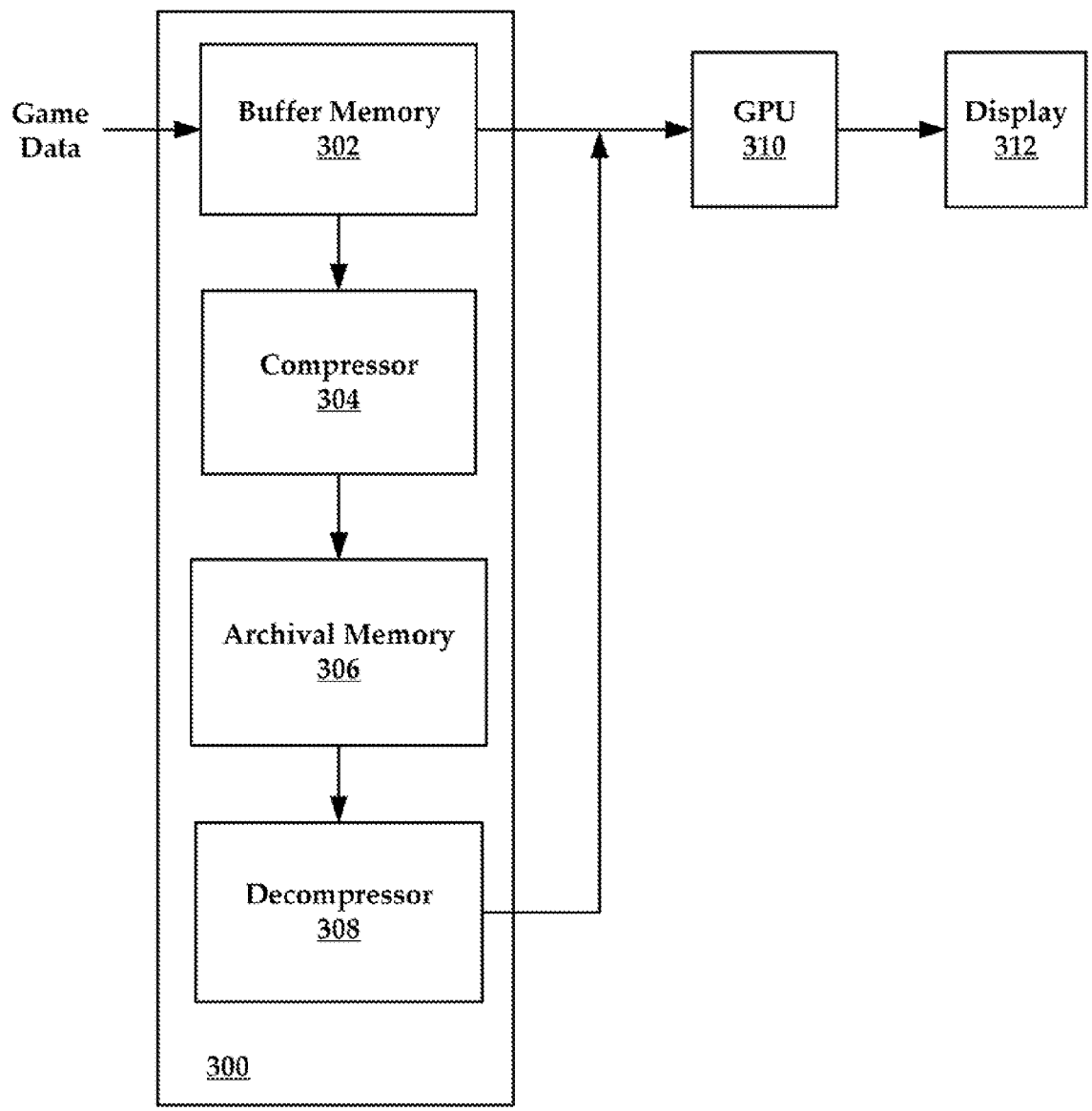
FIG. 3 illustrates a block diagram of an exemplary recording engine according to an embodiment of the present invention.

The record and playback process may be implemented by the recording engine 110 (e.g., recording engine 300 of FIG. 3). The recording engine 110 provides the collective means for a user to save and subsequently view game data independent of when the network game 104 may be played or data related to the game 104 may be broadcast. For example, a player or a spectator may be able to pause a displayed game, review portions of the game data, and so forth using game data stored by use of the recording engine 110. The operation of the recording engine 110 with respect to game data and an exemplary implementation within an electronic entertainment system are discussed in greater detail herein.

Figure 2A:
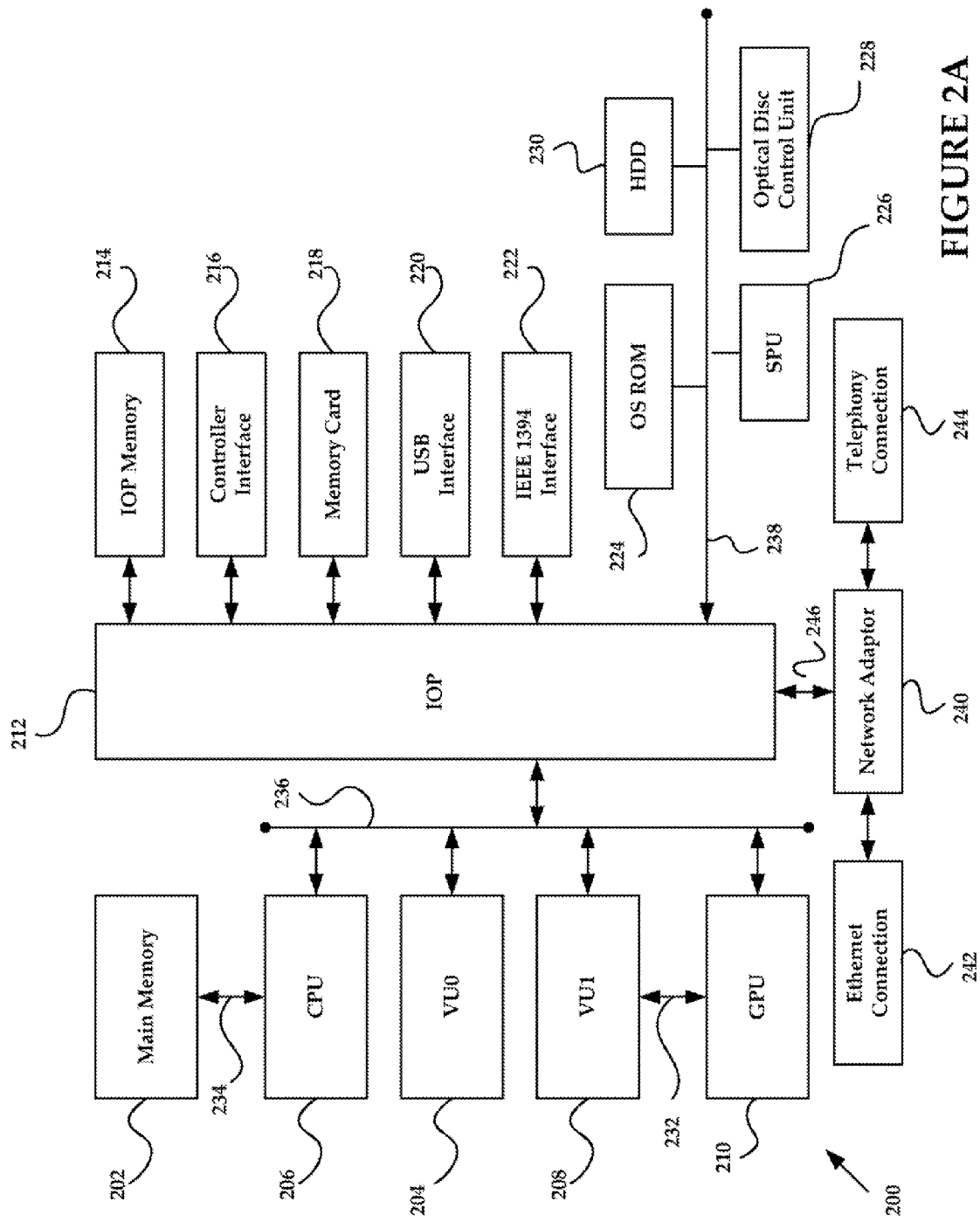
FIG. 2A illustrates a block diagram of an exemplary electronic entertainment system that may be utilized according to embodiments of the present invention.

Referring now to FIG. 2A, a block diagram of one embodiment of an exemplary electronic entertainment system 200, such as may constitute participant client 102 and for playing the game 104 in accordance with one exemplary embodiment of the invention is shown. The elements identified in FIG. 2A are exemplary and may include various alternatives, equivalents, or derivations thereof.

The system 200 may comprise, but is not limited to, a main memory 202, a central processing unit (CPU) 206, vector processing units VU0 204 and VU1 208, a graphics processing unit (GPU) 210, all of which may be coupled via a bus 236 to an input/output processor (IOP) 212. The system 200 may also comprise an IOP memory 214, a controller interface 216, a memory card 218, a Universal Serial Bus (USB) interface 220, and an IEEE 1394 interface 222. The system 200 may further include an operating system read-only memory (OS ROM) 224, a sound processing unit (SPU) 226, an optical disc control unit 228, and a hard disc drive (HDD) 230, all of which may be connected via a bus 238 to IOP 212.

Some embodiments of the system 200 may also include a network adaptor 240, which may offer an Ethernet connection 242 and/or telephony connection 244. The system 200 may be, in one exemplary embodiment, an electronic gaming console; however, the system 200 (or portions thereof) may also be implemented as a general-purpose computer, a set-top box, a hand-held gaming device, or in a mobile device such as a cellular phone. System 200 may further include or be coupled to a recording engine as discussed herein. Various other system architectures may be utilized in conjunction with or as an alternative to the system of FIG. 2A and remain within the scope of the present invention.

Figure 2B:
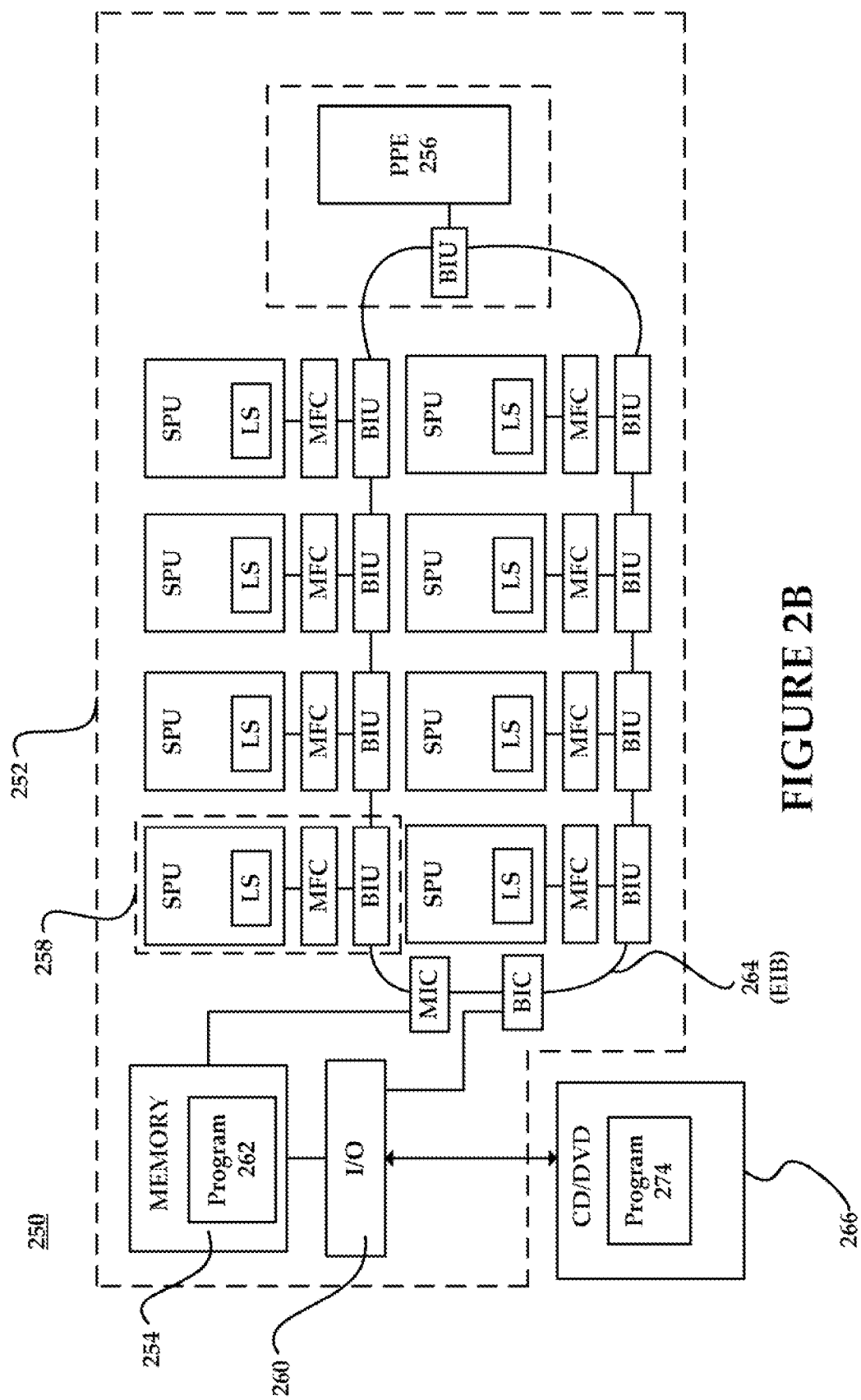
FIG. 2B illustrates a block diagram of a portion of an alternative exemplary electronic entertainment system including a control processor, a plurality of processing units, and a plurality of local memories that may be utilized with embodiments of the present invention.

An example of such an architecture is shown in FIG. 2B, which illustrates a portion of an electronic entertainment system 250 based on a Cell processor 252. The elements identified in FIG. 2B are exemplary and may include various alternatives, equivalents, or derivations thereof. Certain aspects of a computer architecture and high speed processing model utilizing a Cell processor are disclosed in U.S. patent publication number 2002-0138637 for a "Computer Architecture and Software Cells for Broadband Networks," the disclosure of which is incorporated herein by reference.

Through the use of the aforementioned Cell processor, data and applications may be processed and packaged into uniquely identified and uniformly formatted software cells. The uniformity of structure and unique identification facilitates the processing of applications and data throughout a network of Cell processor equipped computing devices. For example, one computing device may formulate a software cell but can distribute that cell to another device for processing. Thus, the cells may migrate throughout a network for processing on the basis of the availability of processing resources on the network.

The cell processor 252, in one exemplary embodiment, comprises a main memory 254, a single power processor element (PPE) 256 and eight synergistic processor elements (SPE) 258. The cell processor 252 may be configured, however, with more than one PPE and any number of SPEs 258. Each SPE 258 comprises a synergistic processor unit (SPU) and a local store (LS).

Memory 254, PPE 256, and SPEs 258 may communicate with each other and with an I/O device 260 over, for example, a ring-type-element interconnect bus (EIB) 264 coupled to a bus interface controller (BIC). The PPE 256 and SPEs 258 may access the EIB 264 through, bus interface units (BIU). The PPE 256 and SPEs 258 may access the main memory 254 over the EIB 264 through memory flow controllers (MFC) and memory interface controller (MIC).

Memory 254 may comprise a program 262 that implements executable instructions. The instructions may be read from a CD/ROM or other optical disc in CD/DVD reader 266 coupled to the I/O device 260, the CD/ROM or other optical disc being loaded into the reader 266. The CD/ROM, too, may comprise a program, executable instructions, or other data 274.

In some embodiments of the aforementioned processor, PPE 256 may be a standard processor capable of stand-alone processing of data and applications. In operation, PPE 256 may schedule and orchestrate the processing of data and applications by SPEs 258 and the associated SPU. In one embodiment, the SPU may be a single instruction, multiple data (SIMD) processor. Under the control of PPE 256, the SPUs may process data and application in a parallel and independent manner. MIC may control accesses by PPE 256 SPUs to data and applications in main memory 254

Returning to FIG. 2A, which may implement a Cell processor like that described in FIG. 2B, the CPU 206, the VU0 204, the VU1 208, the GPU 210, and the IOP 212 communicate via a system bus 236. The CPU 206 communicates with the main memory 202 via a dedicated bus 234. The VU1 208 and the GPU 210 may also communicate with one another via a dedicated bus 232. The CPU 206 executes programs stored in the OS ROM 224 and the main memory 202. The main memory 202 may contain pre-stored programs and may also contain programs transferred via the IOP 212 from, a CD-ROM, DVD-ROM, or other optical disc (not shown) using the optical disc control unit 228. The IOP 212 controls data exchanges between the CPU 206, the VU0 204, the VU1 208, the GPU 210 and other devices of the system 200, such as the controller interface 216, or from other such systems via the network adaptor 240.

The GPU 210 executes drawing instructions from the CPU 206 and the VU0 204 to produce images for display on a display device (not shown). The VU1 208 transforms objects from three-dimensional coordinates to two-dimensional coordinates, and sends the two-dimensional coordinates to the GPU 210. The SPU 226 executes instructions and processes data to produce sound signals that are output on an audio device (not shown).

A user of the system 200 may provide instructions via the controller interface 216 to the CPU 206, which may be coupled to a control device comprising a joystick, directional buttons, and/or other control buttons. Certain game data (as discussed in the context of FIG. 6B, for example) relevant to subsequent playback of game interactions may be generated by the aforementioned manipulation of a controller interface 216. Further, the user may instruct the CPU 206 to store certain game information on the memory card 218, which may be removable (e.g., a flash memory or other non-volatile memory card), or may instruct a character in a game to perform some specified action. Other devices may be connected to the system 200 via the USB interface 220 and the IEEE 1394 interface 222, such as an external hardware device having an increased storage capacity, such as an external hard drive for the archival storage of game data.

Some embodiments of the system 200 may comprise a network adaptor 240. The network adaptor 240 may provide the hardware functionality necessary for the system 200 to connect to the network 106. The network adaptor 240 may comprise, for example, a system connector that operates to connect the adaptor 240 to the system 200 through an expansion bus connector 246. The network adaptor 240 may also comprise a power connector and data connector to allow for the provisioning of power from the system 200 to the adaptor 240 and the exchange of data between the system 200 and the adaptor 240. In some embodiments of the present invention, the network adaptor 240 may also require the installation of certain software in the system 200 to allow for identification and connection to a particular IP address and/or dial-up to a particular Internet Service Provider. Software may also provide other functionalities, such as the creation and maintenance of user profiles, in addition to functional interaction between the system 200 and the network adaptor 240.

The network adaptor 240 may also comprise an Ethernet connection 242. Through the Ethernet connection 242, a network cable (e.g., a 100 Base-TX or 10-Base T) may be coupled to the network adaptor 240 for connection to a network 106. The network cable may, for example, be communicatively coupled to a DSL or cable modem. The network cable may also be communicatively coupled to, for example, a router via a LAN port; the router may then be coupled to a DSL or cable modem through a WAN port. In further embodiments, the Ethernet connection 242 may allow for a network cable to be connected to a wireless Ethernet bridge. The wireless Ethernet bridge may be communicatively coupled to a wireless router utilizing, for example, an 802.11x protocol. The wireless router may be further communicatively coupled to a cable or DSL modem.

The network adaptor 240 may also comprise a telephony connection 244. Through the telephony connection 244, a standard telephone line with, for example, an RJ-11C telephone connector may be connected to the network adaptor 240 and a telephone wall jack. In this regard, the network adaptor 240 may further comprise modem functionality such that the system 200 may communicate data over the public switched telephone network via the telephony connection 244.

Referring now to FIG. 3, a block diagram, of one embodiment of an exemplary recording engine architecture 300, such as may be used with a participant client 102 (FIG. 1) or a spectator client 112 (FIG. 1), portal 114 (FIG. 1) and for recording the game 104 (FIG. 1) and related controller manipulation data in accordance with one embodiment of the invention is shown. The elements identified in FIG. 3 are exemplary and may include various alternatives, equivalents, or derivations thereof.

The recording engine 300 may be disposed within the participant client 102 or spectator client 112, portal 114 or, alternatively, may be a separate device in a local area network, or coupled to the client 102/112 or portal 114. One or more components or functionalities of the recording engine 300 may be distributed over the system and/or network architecture like those disclosed in FIGS. 1, 2A, and 2B. The network architecture may be dedicated to network gaming or a public network, such as the internet. For example, the archival memory 306 accessed by a spectator client 112 may be located at server 108 or another dedicated archival server (not shown).

The recording engine architecture 300 may comprise, but is not limited to, a buffer memory 302, a compressor 304, an archival memory 306, and a decompressor 308. The recording engine architecture 300 of FIG. 3 may be coupled to GPU 310. The buffer 302 may be coupled to both the compressor 304 and to the GPU 310. The compressor 304 may further be coupled to the archival memory 306 which may be coupled to the decompressor 308. The decompressor 308 may be further coupled to the GPU 310 which may produce image data for display on a display 312, which may include images of controller device manipulation as discussed in the context of FIG. 6A, below. Certain data from buffer memory 302 or archival memory 306 may be intermediately subject to processing by vector processing units VU0 204 or VU1 208. Additionally, compressor 304 and decompressor 308 may be a single CODEC module for the compression/decompression and/or transcoding of data and may be embodied in hardware or part of a software based CODEC scheme.

The buffer 302 may receive game data from either a network game 104 being executed on the participant client 102 or from a server 108. The game data may comprise data and drawing instructions received, from, for example, the CPU 206 or the VU0 204. The game data may comprise game 104 information as well as player instructions. The buffer 302 may comprise a volatile memory such as random access memory (RAM), and may be configured to store a portion of the game data over a specified period of time. The game data (examples of which are discussed in the context of FIG. 6B, below) may be stored using a first-in-first-out (FIFO) methodology in which the oldest data in the memory is overwritten with new data as that data is generated. Therefore the buffer 302 may store a limited portion of the game data. The actual amount of the game data may be adjusted by the user based on the amount of volatile memory available or may be intelligently adjusted based on available system resources.

In one example, the portion of the game data may translate into a game segment 30 minutes long. The game data may be subsequently routed from the buffer 302 to the GPU 310 and/or the compressor 304 depending on the particular disposition of the game data as is discussed herein (e.g., archival, display, broadcast, and so forth).

The compressor 304 may receive game data from the buffer 302 and compresses the game data. The compressor 304 may additionally be configured to convert the game data to another data format prior to compression. After compression, the compressed game data may be delivered to the archival memory 306 as may occur over a bus. The game data may be compressed prior to archival storage in order to conserve memory space using a compression algorithm such as MPEG, MPEG-2, MPEG-4, or H.264. Other data compression algorithms may be used in accordance with the present invention and will be apparent to one skilled in the art.

The archival memory 306 may receive and store the compressed game data. When a user wishes to play back a selected portion of the game data, a portion of the compressed game data may be delivered to decompressor 308, which may occur over a bus. As noted above, the decompressor 306 may be part of a single compression/decompression module (CODEC). The archival memory 306 may comprise a non-volatile memory, such as random access memory (RAM), large enough to store significant portions of the compressed game data. The user may additionally expand archival memory 306 by, for example, adding memory or connecting the recording device to external storage, such as a hard drive. The archival memory 306 may further comprise memory accessed over a network. The archival memory 306 may also include an index used to organize the compressed game data to simplify data retrieval. For example, the index may reflect game title, data played, last access data, modification data, whether or not the data was broadcast, recipients of the broadcast, sue, player who generated the data, game level, user notes concerning the particular game data such as the performance of a particular move or defeat of a particular enemy, and other indicia that might be of use in searching for particular game data. This data may be used by a user of portal 114 with respect to directing the broadcast switch 116 to particular game data.

When the user selects a portion of the compressed game data to be displayed (either by specific file name or in response to a structured search), the decompressor 308 may receive the appropriate portion of the compressed game data from the archival memory 306, decompresses the portion of the game data, and deliver the portion of the game data to the GPU 310.

The GPU 310 may receive game data from either the buffer 302 or the decompressor 308. As discussed herein, the GPU 310 may receive two-dimensional data and executes drawing instructions to produce images for display on a display 312. Thus, the recorded game data may be displayed to a user, for example, in either real-time (e.g., having come directly from buffer memory 302) or having been time-shifted as may be the case with data from archival memory 306. Game data—either archived or real-time—may also be broadcast to other recipients as discussed herein.

Figure 4:
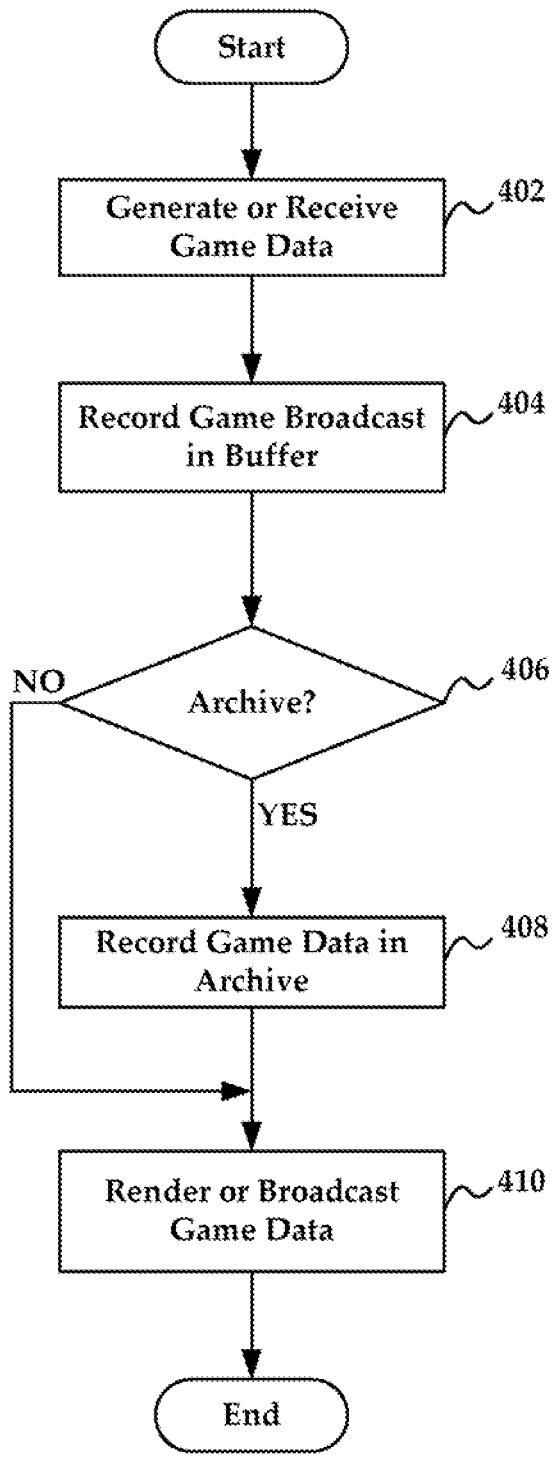
FIG. 4 illustrates a flow diagram of an exemplary process for recording game data in accordance with an embodiment of the present invention.

FIG. 4 illustrates a flow diagram of an exemplary process for recording game data in a recording engine 110 according to an exemplary embodiment of the present invention. The steps identified in FIG. 4 (and the order thereof) are exemplary and may include various alternatives, equivalents, or derivations thereof including but not limited to the order of execution of the same. The steps of the process of FIG. 4 (and its various alternatives) may be embodied in hardware or software including a machine-readable medium (e.g., optical disc, memory card, carrier waves, etc.) comprising instructions executable by a machine such as the processor of a computing device.

The exemplary process illustrated in FIG. 4 may be performed repeatedly during the play of a game 104 or a game broadcast such that particular portions of the network game 104 (as played) may be recorded into archival memory 306 rather than an entire broadcast. The process for recording game data may also operate simultaneously with a process for playback control, as discussed herein, for example in FIG. 5.

In step 402, the buffer 302 may receive game data generated by the game 104 and/or the play thereof. The game data may be generated locally on a participant client 102 or received as part of a received broadcast, multicast, or unicast of game data from one or more participant clients 102. Game data may also be generated by spectator clients 112 not local to buffer 102 (e.g., one user is broadcasting game data they previously received and recorded from another user to still further users after the game play actually took place). Alternatively, the game data may be received as a real-time broadcast from a server 108 or in response to broadcast instructions received by the server 108 from, for example, a participant client 102 on the network 106 and wanting to share their game data. Game data may embody any variety of data types, protocols, and so forth. Game data may include information related to controller manipulation vis-à-vis in-game interactions as discussed in the context of FIG. 6B below as well as U.S. patent application No. 60/860,937, the disclosure of which has been previously incorporated herein by reference.

It should be noted that any reference to broadcast herein is for convenience and is meant to be applicable to other forms of transmission such as multicast (e.g., data is transmitted to select multiple recipients who have joined the appropriate multicast group); unicast (e.g., a specific user receives a specific data transmission); as well as a broadcast (e.g., a data transmission to a number of recipients simultaneously). The particular transmission methodology should be understood to be limited only as specifically set forth in the claims.

In step 404, the recording engine 300 may record the game data in the buffer 302. As discussed herein, game data may be recorded in the buffer 302 using a FIFO method or other cyclical process. The buffer 302 may, therefore, contain only recently generated game data. The buffer 302 is not limited to FIFO storage and other memory maintenance methodologies may be implemented (e.g., last-in-first-out (LIFO), user-queried storage, prioritized storage and so forth).

In step 406, the recording engine 300 may determine whether to record the game data in the archival memory 306 (FIG. 3). This determination may be based on whether the recording engine 300 has received a command from the user to begin archiving the game. The user may issue the playback command by setting a timer to record a network game 104 to be broadcast or by initiating recording during a network game 104 via a controller or input device.

In step 408, if the recording module has a received a command to record the game data in the archival memory, the data in buffer 302 may be directed to the compressor 304 from which the archival memory 306 may receive the compressed game data. The archived portion of the game data may then be accessible to the user after the buffer 302 has overwritten the portion of the game data from its memory.

In step 410, the GPU 310 may render the game data and/or the game data may be broadcast over a network 106 regardless of whether the game data has been stored in the archival memory 306. In the rendering scenario, the GPU 310 may render the game data stored in the buffer 302 or the archival memory 306. The game data may then be displayed to a user on an appropriate display device. The display 312 may comprise or be a part of a user interface that supports the receipt or display of playback commands such as a media player application. The user interface may be particular to a computing platform or a video game 104. For example, a particular game 104 may cause for the generation of a game specific user interface. The interface and the commands generated through the interface may be coupled to the recording engine 300, which may be configured to respond to the receipt, of particular commands (e.g., rewind, play, fast forward) including an indication to display a particular portion (e.g., a selected portion) of game data.

In some embodiments of the present invention, the game data received over a broadcast may not immediately be rendered or broadcast in step 410. For example, game data may be received in the background while the user is engaged in not networked game play (e.g., playing a game versus the CPU and not another player over a network or playing another player locally on the same entertainment system). Depending on, for example, the particularities of the entertainment system and network adaptor (e.g., processing power, data exchange capabilities, and the like), the user may also be engaged in network game play while simultaneously receiving the game broadcast. In this way, the user may be able to play a game while receiving a game broadcast for later viewing when the user's particular game is complete. This operation would be akin to watching one television program while recording another through the user of dual receivers.

In the broadcast scenario, the game data or a portion of the game data may be broadcast over the network 106. The broadcast game data may then available to one or more spectator clients 112 and portal 114. The game data may be broadcast from a server 108 or one or more participant clients 102. The broadcast may be real-time or, if it has been stored in the archival memory 306, time-shifted. If the broadcast is time-shifted, the compressed game data may be broadcast over the network 106 and decompressed at the spectator clients 112 and portal 114. The game data may be simultaneously rendered and broadcast.

Figure 5:
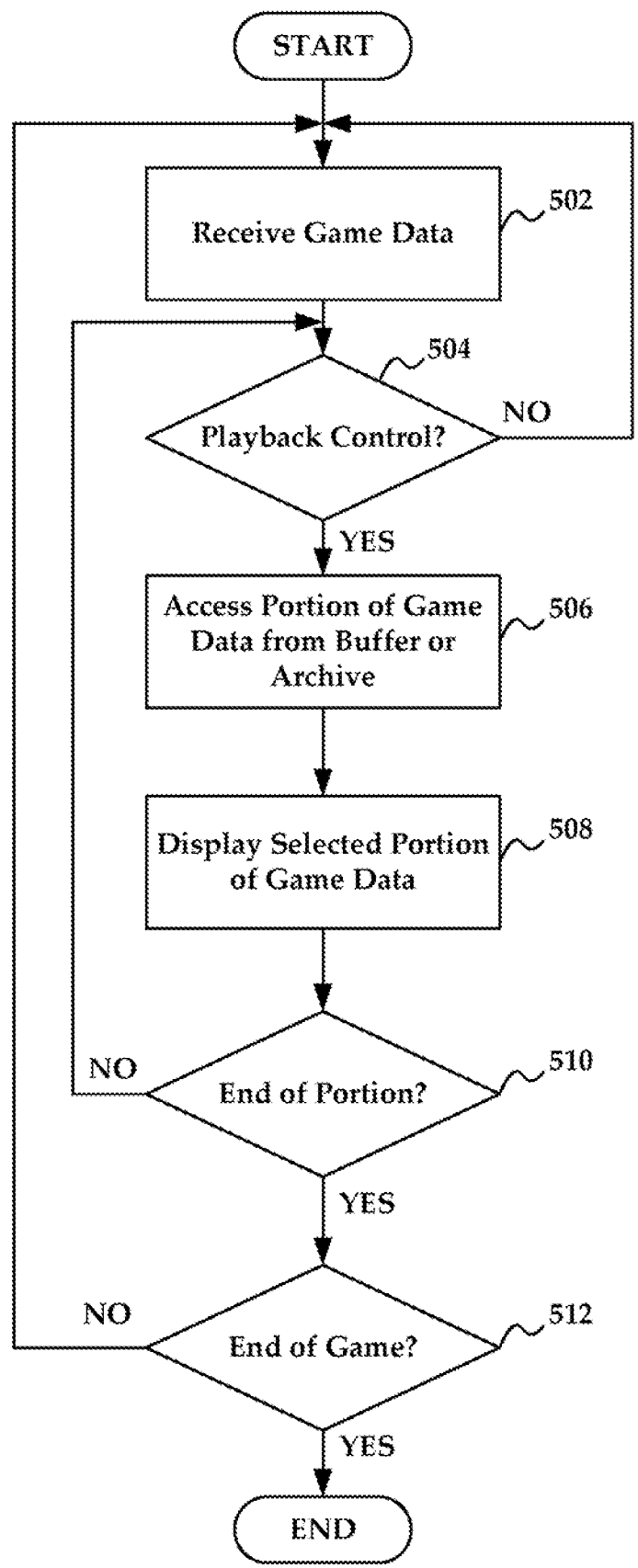
FIG. 5 illustrates a flow diagram of an exemplary process for controlling playback of game data in accordance with an embodiment of the present invention.

FIG. 5 illustrates a flow diagram of an exemplary process for controlling playback of game data according to an exemplary embodiment of the present invention. The steps identified in FIG. 5 (and the order thereof) are exemplary and may include various alternatives, equivalents, or derivations thereof including but not limited to the order of execution of the same. The steps of the process of FIG. 5 (and its various alternatives) may be embodied in hardware or software including a machine-readable medium (e.g., optical disc, memory card, carrier waves, etc.) comprising instructions executable by a machine such as the processor of a computing device.

The playback commands may comprise play, pause, stop, rewind, fast forward, skip, record, and the like. Editing commands may also be used. The playback commands may be represented through any variety of computing languages, protocols, formats, structures and so forth. The playback commands may be unique to a particular user interface, game 104, computing device and so forth. In order for the playback commands to operate, the selected portion of the game data may need to be present in the buffer 302 or in the archival memory 306 either locally or accessible over some communications means (e.g., via a LAN). Particular portions of data to be played back, edited, or otherwise handled by an embodiment of the present invention may be indicated through the aforementioned playback command or a combination of the same.

In step 302, the recording engine 300 may receive game data from the game 104. The game data may be rendered and displayed on a display 312. The game data may be generated locally on a participant client 102. Alternatively, the game data may be received as a broadcast from a server 108 or one or more participant clients 102. In some embodiments, the game data may be data that has been passed from a number of different spectator clients 112 (e.g., 'viral video') in that the game data reflects a particularly impressive action in a game that is shared with a number of game players in a particular community.

In step 504, the recording engine 300 may determine whether a playback command has been received. The playback command may be received from a user via a user interface at display 312. The display 312 may be configured to display a menu from which the user selects a portion of a game 104. An input device may also be present and to provide playback control functionality. Input device may include a remote control, a keyboard, a mouse, a touchpad, a joystick, a game controller, or the like.

If a playback command has not been received, the recording module may return to step 502 in which the game may or may not be displayed. During this period, a local memory buffer or other memory may continue to receive game data that may be later subject to various playback commands. In some embodiments, game data may be received in real-time (during which time filling of a memory buffer may be desirable) or may be transmitted in faster-than-real-time subject to the compression of the data prior to delivery (whereby extended portions of the data may be immediately accessible as a client buffer has been filled with more game data than can be rendered at any one time). In some embodiments, playback control may not be offered until a particular quantity of game data has arrived in order to avoid 'starving' the buffer of game data during playback.

In step 506, the recording engine 300 may access a portion of the game data from the buffer 302 or the archival memory 306. If the portion of the game data is available in the buffer 302, the portion may first be retrieved from the buffer 302. Alternatively, older data may be retrieved from the archival memory 306 and decompressed by the decompressor 308 (FIG. 3). Data may be accessed in response to not only playback control but also certain search functionality if several archived selections of game data are present. Various means for searching game data have been previously described (e.g., title, date, etc.).

In step 508, the selected portion of the game data may be processed by the GPU 310 and displayed on display 312. The selected portion of the game data may be a shorter section of the portion of the game data retrieved in step 506.

In step 510, the recording engine may determine whether the end of the selected portion of the data has been reached. A user may interrupt playback of a selected portion of the game data at any point during the playback to end the playback or to select a different portion of the data. The user may interrupt the playback by transmitting a playback command such as stop, play, fast forward, rewind, or pause. If the end of the portion has not been reached, the selected, portion of the game data may continue to be displayed while the recording engine repeats step 504.

In some embodiments of the present invention, various portions of game data may be edited and/or concatenated, to create a 'best of' highlight real that may be independently stored and broadcast. Further, as may be subject to the availability of particular editing tools that may be local or remote to an entertainment system, a user may add music or other ancillary data to the highlight real whereby a background music track may be added to accompany the highlights. This 'highlight reel' may be generated by exporting certain archived game data via a portable memory device to another computing device comprising the requisite editing tools. The edited highlight reel may then be reintroduced to the game system via the same aforementioned portable memory device. Editing may further include the introduction of advertising, captions, titles, special effects, slow-motion or accelerated replay, picture-in-picture, and other effects.

In step 512, if the end of the portion of game data has been reached, the recording module may determine whether the end of game 104 or the recorded game data has occurred. Alternatively, step 512 may determine whether an end of a game level has occurred. If the network game 104 or the recorded game data has not yet occurred, the recording module may repeat step 502 and continue displaying the game data.

Figure 6A:
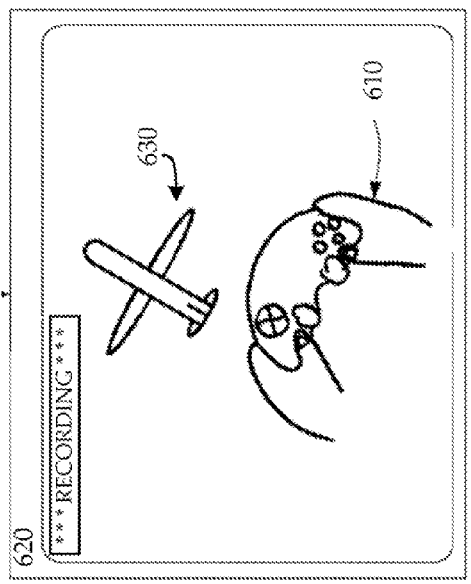
FIG. 6A illustrates an exemplary embodiment of the present invention where recorded game data is displayed during a playback operation, the playback operation including a graphic display of a game controller representing the real-world manipulation of a control device to execute a particular maneuver being viewed during the playback operation.

FIG. 6A illustrates an exemplary embodiment of the present invention where recorded game data is displayed during a playback operation. In the exemplary embodiment illustrated in FIG. 6A, the playback operation includes a graphic display of a game controller 610 representing the real-world manipulation of a physical control device (not shown) to execute a particular maneuver being viewed on display device 620 during the playback operation. A more detailed discussion with respect to providing game assistance through a graphic controller display is provided in U.S. patent application No. 60/860,937, the disclosure of which has previously been incorporated herein by reference.

Figure 6B:
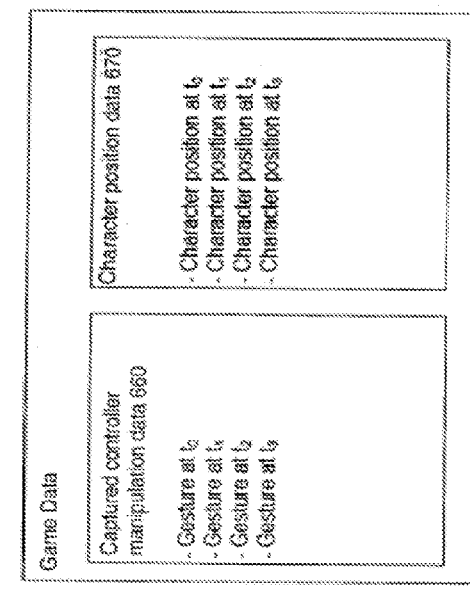
FIG. 6B illustrates an exemplary embodiment of the present invention where game data is displayed during a recording operation including a graphic display of a game controller representing the real-world manipulation of a control device to execute a particular maneuver being viewed during the recording operation.

As shown in FIG. 6A, when the controller is manipulated in the physical domain during the original game play session, (e.g., the orientation of the controller with respect to the physical world was changed), this change is reflected in controller manipulation data as is discussed in the context of FIG. 6B. For example, if a game participant used yaw in the physical domain to manipulate an in-game character 630 (e.g., the airplane), then the change in yaw that may have caused a change in the orientation of the in-game character 630 may be further reflected in the controller manipulation data. The controller manipulation data may be recorded by recording engine 300 as was discussed in the context of, for example, FIG. 3.

Playback of the game data recorded by recording engine 300 may include the graphic display of game controller 610. This graphic display (610) may be representative of the aforementioned real-world manipulation of the physical, controller device as reflected in the aforementioned controller manipulation data. Layout on the display device 620 may be controlled by a particular network game title (104) and/or by the recording engine (300). The layout may include a game area 640 and a controller area 650. Other display areas may also be included on display 620 such as advertisement or sponsorship areas (not shown).

Game area 640 may include the game environment and various characters and/or objects being viewed during a playback operation. Content displayed in the game area 640 may be generally or identically representative of the actions and events seen by the participant that generated the game data being viewed during playback (i.e., the user who played the game).

Controller area 650 may include the graphic display of the game controller 610. Graphic display 610 provides a graphical view of the manipulation of the controller in the physical domain and that relates to the action and/or events being displayed concurrently in game area 640. In this way, the means by which to execute a particular maneuver that is not easily explained may be easily viewed and imitated.

Controller area 650 may also display text related to the graphic display of the game controller 610, an audio accompaniment reciting the text (e.g., a voice over), or various combinations of the same. The graphic display 610 illustrates the particular means in which the real-world controller was oriented (e.g., position) and/or manipulated (e.g., particular button presses) in the physical domain to result in the corresponding actions and/or events being displayed in game area 640. In some embodiments, the controller area 650 may also include a graphic representation of hands of a user actually manipulating the controller.

FIG. 6B illustrates an exemplary embodiment of the present invention where game data is displayed during a recording operation including a graphic display of a game controller representing the real-world manipulation of a control device to execute a particular maneuver being viewed during the recording operation. When the controller is manipulated in the physical domain during the game play session (e.g., the orientation of the controller with respect to the physical world is changed), this change is reflected in controller manipulation data.

For example, and as shown in FIG. 6B, the game participant is using yaw to the right and in the physical domain (as depicted with respect to the graphic display 610 of the controller) to manipulate the in-game character 630. The change in yaw causes a change in the orientation of the in-game character 630 as may be reflected in the controller manipulation data, which may be recorded by recording engine 300.

Figure 6C:
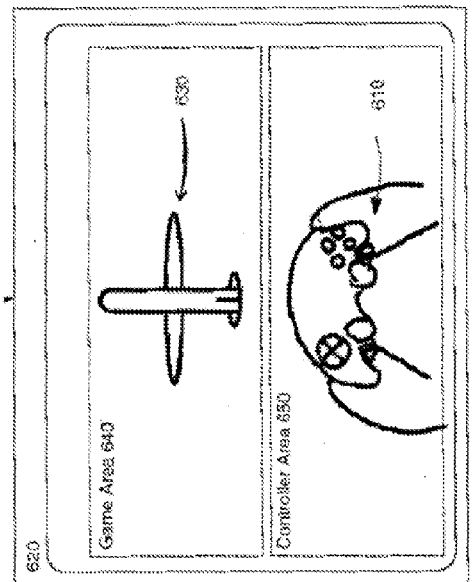
FIG. 6C illustrates an exemplary embodiment of the present invention where recorded game data is displayed during a playback operation including a graphic display of a game controller representing the real-world manipulation of a control device to execute a particular maneuver being viewed during the playback operation.

FIG. 6C illustrates an exemplary embodiment of the present invention where recorded game data is displayed during a playback operation including a graphic display of a game controller representing the real-world manipulation of a control device to execute a particular maneuver being viewed during the playback operation. The 'played back' data of FIG. 6C may include the 'recorded data' of FIG. 6B.

With respect to FIG. 6C, the controller has been previously manipulated in the physical domain during the original, recorded game play session. Changes in controller orientation have been reflected in controller manipulation data. Specifically, the game participant previously used (and recorded) yaw to the left in the physical domain as depicted with respect to the graphic display 610 of the controller. This manipulation resulted in a corresponding manipulation of the in-game character 630. The change in yaw, in turn, caused a change in the orientation of the in-game character 630 as reflected in the controller manipulation data, which as previously recorded by recording engine 300. The recorded data has, in turn, been processed to display the played back display of game information.

The controller image rendered on the display is optional and may be turned on or off during a recording session and/or playback session. Further, the rendering of the controller image may have various display permutations. For example, the screen may be split or otherwise scaled. The controller image itself may be scaled or displayed in a half-tone or some other blending with the remainder of the game environment in order to be informative yet non-intrusive.

Figure 6D:
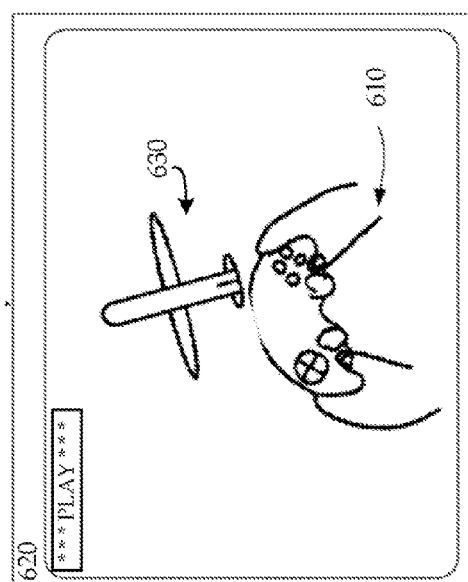
FIG. 6D illustrates an exemplary set of controller manipulation and controller position data as may be generated in some embodiments of the present invention.

FIG. 6D illustrates an exemplary set of controller manipulation data 660 and character position data 670 as may be generated in some embodiments of the present invention. Controller manipulation 660 and character position 670 data may be received at a game console or other computing device from a game player's controller device. Manipulation data 660 and position data 670 may, respectively, represent commands and controller manipulations that occurred during the course of game play.

Controller manipulation data 660 may be representative of data received from a controller device during the course of game play. Position data 670, in turn, may be representative of a position of a game character during game play. The controller manipulation data 660 and position data 670 are, in an embodiment, synchronized whereby game action may be replayed in the context of information related to controller manipulation.

By synchronizing data, a game participant, spectator, or any other party viewing a recorded game session may observe the manipulation of the controller and corresponding action in the game that corresponds to that manipulation. For example, in addition to playing back a touchdown thrown in a football game, the console can display the controller manipulations which resulted in the touchdown. In another embodiment, game data and corresponding controller manipulation data can be played back in slow motion. Various other implementations of a graphic display of controller data are discussed in the aforementioned U.S. patent application No. 60/860,937.

In some embodiments, the controller may include a controller device like that described in U.S. patent publication number 2007-0021208 for "Obtaining input for Controlling Execution of a Game Program," the disclosure of which is incorporated herein by reference. Such a controller may allow for generation of controller manipulation data 660 corresponding to pitch, roll, and yaw along individual axes in three-dimensional space. Such a controller may further include accelerometers or inertial sensors for generating additional controller manipulation data 660.

While various embodiments have been described above, it should be understood that they have been presented by way of example only, and not limitation. For example, any of the elements associated with the participant client 102, the network game 104, the spectator client 112, the portal 114, and/or the server 108 may employ any of the desired functionality set forth hereinabove. Thus, the breadth and scope of a preferred embodiment should not be limited by any of the above-described exemplary embodiments.

The present invention may be further implemented in a game 104 that may be operable over a mixed network of end user devices (e.g., participant clients 102 and/or spectator clients 112). For example, one participant client device may be a personal computer; a second participant client device may be a home entertainment system such as a PlayStation®2 or PlayStation®3 available from Sony Computer Entertainment Inc. Another participant client device may be a portable gaming device such as a PSP™ (also from Sony Computer Entertainment Inc.) whereas a fourth participant client may be a home entertainment system of a different manufacture such, as an Xbox as manufactured by Microsoft Corporation or a GameCube or a Wii as manufactured by Nintendo Co., Ltd. The present playback methodologies described herein are fully intended to be operable amongst a related or non-related group of devices. The present invention may also be implemented with cross-title neutrality wherein an embodiment of the present system may be utilized across a variety of titles from various publishers.

What is claimed is:

1. A system for network playback of a video game, the system comprising:
   a participant client computing device associated with at least one participant playing a video game, the participant client computing device coupled to a network, the participant client computing device including:
      a recording engine that receives game data generated by the at least one participant playing the video game, the game data including controller manipulation data corresponding to a physical domain manipulation of a game controller coupled to the participant client computing device, the controller manipulation data generated during participant interaction with the video game, and
      a memory coupled to the recording engine that stores the game data received by the recording engine and corresponding meta-data to identify different portions within the same game data; and
   a spectator client computing device coupled to the network, the spectator client computing device including a processor and a memory storing executable instructions, wherein execution of the instructions by the processor:
      generates a user interface that receives playback commands from a spectator associated with the spectator client computing device,
      transmits the playback commands over the network, wherein the playback commands include:

an indication to play back a spectator-selected portion of the game data stored in the memory of the participant client computing device, wherein the spectator-selected portion of the game data is selected based on user input via a menu associated with the spectator client computing device, the user input corresponding with the meta-data included in the game data stored in the memory of the participant client computing device, and wherein the spectator-selected portion of the game data is a section of the stored game data that is shorter than the full length of the stored game data, and an indication to edit the spectator-selected portion of game data, wherein editing includes introducing into the spectator-selected portion of game data at least one of advertising, captions, titles, special effects, slow-motion replay, accelerated reply, and picture-in-picture, displays the spectator-selected portion of the game data on the spectator client computing device and one or more other spectator client computing devices coupled to the same network;

generates a textual interface that facilitates communication between a spectator of the spectator client computing device and one or more other spectators viewing the spectator-selected portion of game data, and generates the menu that provides a plurality of options including searching other stored game data via the meta-data and sharing the spectator-selected portion of game data with one or more other the one or more other spectators.

2. The system of claim 1, wherein the spectator-selected portion of the game data is played back from the memory of the participant client computing device.

3. The system of claim 1, wherein the spectator-selected portion of the game data is played back from a network storage device communicatively coupled to the network, the game data having been copied to the network storage device from the participant client computing device.

4. The system of claim 1, wherein the recording engine stores the game data while the game data is simultaneously broadcast to another recipient over the network.

5. The system of claim 1, wherein the recording engine stores the game data while game data associated with a second video game is simultaneously broadcast to another recipient over the network.

6. The system of claim 1, wherein the spectator-selected portion of the game data played back in response to the playback commands includes a graphic display of the game controller.

7. The system of claim 6, wherein the graphic display of the game controller is scaled against a game environment of the video game.

8. The system of claim 6, wherein the graphic display of the game controller is visually blended with a game environment of the video game.

9. The system of claim 6, wherein the graphic display of the game controller includes at least one participant manipulation of the game controller that corresponds to the physical domain manipulation of the game controller by the at least one participant during interaction with the video game and that generated the spectator-selected portion of the game data stored in the memory of the participant client computing device.

10. The system of claim 9, wherein the game controller coupled to the participant client computing device generates controller manipulation data corresponding to pitch, roll, and yaw in three-dimensional space.

11. The system of claim 9, wherein play back of the game data includes a graphic representation of hands of the participant manipulating the game controller.

12. The system of claim 1, wherein the participant client computing device and spectator client computing device are each a portable gaming device and the network is a mobile ad-hoc network.

13. The system of claim 12, wherein the participant client computing device transmits the game data to the spectator client computing device over the mobile ad-hoc network.

14. A method for playback of game data, comprising
storing the game data in a memory device, the game data including controller manipulation data corresponding to a physical domain manipulation of a game controller by a participant during interaction with a video game and meta-data used to identify different portions within the same game data;

receiving over a network from a spectator client computing device a plurality of playback commands identifying a spectator-selected portion of the game data, wherein the spectator-selected portion of the game data is a section of the stored game data that is shorter than the full length of the stored game data, and wherein the plurality of playback commands include:
an indication to play back the spectator-selected portion of the game data, wherein the spectator-selected portion of the game data is selected based on user input via a menu associated with the spectator client computing device, the user input corresponding with the meta-data included in the game data stored in the memory device; and an indication to edit the spectator-selected portion of the game data, wherein editing includes introducing into the spectator-selected portion of game data at least one of advertising, captions, titles, special effects, slow-motion replay, accelerated reply, and picture-in-picture;

accessing the spectator-selected portion of the game data stored in the memory device as identified by the playback commands;

displaying the spectator-selected portion of the game data at the spectator client computing device, wherein displaying the spectator-selected portion of the game data includes displaying a graphic display of a game controller and at least one participant manipulation of the game controller that corresponds to the physical domain manipulation of the game controller by the participant during interaction with the video game and that generated the spectator-selected portion of the game data stored in the memory device, and wherein the spectator-selected portion of the game data is also displayed on one or more other spectator client computing devices coupled to the same network;

facilitating by way of a textual interface communication between a spectator of the spectator client computing device and one or more other spectators viewing the spectator-selected portion of game data; and providing a plurality of options on the menu including functions for searching other stored game data via the meta-data and sharing the spectator-selected portion of game data with the one or more other spectators.

15. The method of claim 14, wherein the game data is generated and stored in a memory at a participant client computing device, the play back of the spectator-selected portion of the game data occurring from the memory at the participant client computing device.

16. The method of claim 14, wherein the game data is generated at a participant client computing device and subsequently stored in a memory at a network storage device communicatively coupled to the network, the display of the spectator-selected portion of the game data occurring from the memory at the network storage device.

17. The method of claim 14, wherein a second portion of the game data is recorded simultaneously with the display of the spectator-selected portion of the game data.

18. The method of claim 14, wherein a second portion of the game data is recorded simultaneously with the display of the spectator-selected portion of game data received over the network.

19. The method of claim 14, wherein the display of the game controller is scaled against a game environment of the video game.

20. The method of claim 14, wherein the display of the game controller is visually blended with a game environment of the video game.

21. The method of claim 14, wherein the controller manipulation data is generated by a control device configured to generate controller manipulation data corresponding to pitch, roll, and yaw in three-dimensional space.

22. The method of claim 14, wherein displaying the spectator-selected portion of the game data further includes displaying a graphic representation of hands of a user manipulating the game controller.

23. A non-transitory computer readable storage medium having embodied thereon a program, the program having instructions for playback of game data, the instructions being executable by a processor to perform a method, the method comprising:
storing the game data in a memory device, the game data including controller manipulation data corresponding to a physical domain manipulation of a game controller by a participant during interaction with a video game and meta-data used to identify different portions within the same game data;
receiving over a network from a spectator client computing device a plurality of playback commands identifying a spectator-selected portion of the game data, wherein the spectator-selected portion of the game data is a section of the stored game data that is shorter than the full length of the stored game data, and wherein the plurality of playback commands include:
an indication to play back the spectator-selected portion of the game data, wherein the spectator-selected portion of the game data is selected based on user input via a menu associated with the spectator client computing device, the user input corresponding with the meta-data included in the game data stored in the memory device; and
an indication to edit the spectator-selected portion of the game data, wherein editing includes introducing into the spectator-selected portion of game data at least one of advertising, captions, titles, special effects, slow-motion replay, accelerated reply, and picture-in-picture;
accessing the spectator-selected portion of the game data in the memory device as identified by the playback commands;
displaying the spectator-selected portion of the game data on the spectator client computing device, wherein displaying the spectator-selected portion of the game data includes displaying a graphic display of a game controller and at least one participant manipulation of the game controller that corresponds to the physical domain manipulation of the game controller by the participant during interaction with the video game and that generated the spectator-selected portion of the game data stored in the memory device, and wherein the spectator-selected portion of the game data is also displayed on one or more other spectator client computing devices coupled to the same network;
facilitating by way of a textual interface communication between a spectator of the spectator client computing device and one or more other spectators viewing the spectator-selected portion of game data; and
providing a plurality of options on the menu including functions for searching other stored game data via the meta-data and sharing the spectator-selected portion of game data with the one or more other spectators.

24. The non-transitory computer-readable storage medium of claim 23, wherein a second portion of the game data is recorded simultaneously with the display of the spectator-selected portion of the game data.

25. The non-transitory computer-readable storage medium of claim 23, wherein a second portion of the game data is recorded simultaneously with the display of the spectator-selected portion of game data received over the network.

26. The non-transitory computer-readable storage medium of claim 23, wherein the display of the game controller is scaled against a game environment of the video game.

27. The non-transitory computer-readable storage medium of claim 23, wherein the display of the game controller is visually blended with a game environment of the video game.

28. The non-transitory computer-readable storage medium of claim 23, wherein the controller manipulation data is generated by a control device that generates controller manipulation data corresponding to pitch, roll, and yaw in three-dimensional space.

29. The non-transitory computer-readable storage medium of claim 23, wherein displaying the spectator-selected portion of the game data further includes displaying a graphic representation of hands of a user manipulating the game controller.

30. A method for playback of video content in a network environment, the method comprising:
storing in memory pre-recorded video content received from one or more providers of video content in the network environment at a network storage device, wherein the pre-recorded video content includes meta-data to identify different portions of the pre-recorded video content;
receiving a plurality of playback commands from a spectator client computing device in the network environment, the playback commands corresponding to a spectator-selected portion of a first pre-recorded video content stored at the network storage device, wherein the spectator-selected portion of the first pre-recorded video content is a section of the first pre-recorded video content that is shorter than the full length of the first pre-recorded video content, and wherein the playback commands include:
an indication to play back the spectator-selected portion of the first pre-recorded video content stored at the network storage device, wherein the spectator-selected portion of the first pre-recorded video content is selected based on user input via a menu associated with the spectator client computing device, the user input corresponding with the meta-data included in the pre-recorded video content stored in the memory, and an indication to edit the spectator-selected portion of the first pre-recorded video content, wherein editing includes introducing into the spectator-selected portion of the first pre-recorded video content at least one of advertising, captions, titles, special effects, slow-motion replay, accelerated reply, and picture-in-picture;

retrieving the spectator-selected portion of the first pre-recorded video content from storage at the network storage device, wherein the retrieved spectator-selected portion of the first pre-recorded video content is identified by the playback commands received from the spectator client computing device;

transmitting the retrieved spectator-selected portion of the first pre-recorded video content to the spectator client computing device for display on a playback device associated with the spectator client computing device;

displaying the spectator-selected portion of the first pre-recorded video content on the spectator client computing device and one or more other spectator client computing devices coupled to the same network;

facilitating by way of a textual interface communication between a spectator of the spectator client computing device and one or more other spectators viewing the spectator-selected portion of the first pre-recorded video content; and providing a plurality of options on the menu including functions for searching other stored pre-recorded video content via the meta-data and sharing the spectator-selected portion of the first pre-recorded video content with the one or more other spectators.

31. The method of claim 30, wherein the playback commands are received from the spectator client computing device via a gaming console, the gaming console coupled to the playback device.

32. The method of claim 30, wherein the pre-recorded video content corresponds to action in a video game.

33. The method of claim 30, further comprising:

receiving a further playback command from the spectator client computing device, the further playback command corresponding to a spectator-selected portion of a second pre-recorded video content stored at the network storage device;

retrieving the spectator-selected portion of the second pre-recorded video content from storage at the network storage device, wherein the retrieved spectator-selected portion of the second pre-recorded video content is identified by the further playback command; and transmitting the retrieved spectator-selected portion of the second pre-recorded video content to the spectator client computing device for display on the playback device associated with the spectator client computing device, wherein the spectator client computing device alternates between viewing the spectator selected portions of the first and the second pre-recorded video content via instructions provided through a user interface displayed at the playback device.

34. The system of claim 30, wherein the spectator-selected portion of the first pre-recorded video content played back in response to the playback commands includes an advertisement within a graphic display of a game controller.

35. The method of claim 30, further comprising editing the spectator-selected portion of the first pre-recorded video content to include an advertisement when the indication to edit the spectator-selected portion of the first pre-recorded video content is an indication to introduce into the spectator-selected portion of the first pre-recorded video content at least one of captions, titles, special effects, slow-motion replay, accelerated reply, and picture-in-picture.

* * * * *